United States Patent [19]

Wasada

[11] Patent Number: 4,538,713
[45] Date of Patent: Sep. 3, 1985

[54] FRICTION CLUTCH DIFFERENTIAL AXLE

[75] Inventor: Yuichi Wasada, Saitama, Japan

[73] Assignee: Honda Giken Kogyo Kabushiki Kaisha, Tokyo, Japan

[21] Appl. No.: 537,496

[22] Filed: Sep. 30, 1983

[30] Foreign Application Priority Data

Oct. 1, 1982 [JP] Japan .......................... 57-149587[U]

[51] Int. Cl.³ .......................... F16D 13/44; B60B 27/00
[52] U.S. Cl. .................................. 192/54; 192/70.28; 192/70.13; 192/70.2; 192/94
[58] Field of Search .................. 192/54, 55, 56, 66, 192/97, 70.28, 70.13, 70.2, 70.16, 34; 280/87.1, 92, 62, 69; 301/124 H, 124 R, 125, 126

[56] References Cited

U.S. PATENT DOCUMENTS

| | | | |
|---|---|---|---|
| 1,122,020 | 12/1914 | Michaelson | 192/97 |
| 2,059,935 | 11/1936 | Eason | 192/66 |
| 2,632,543 | 3/1953 | Wilson | 192/70.13 |
| 3,781,031 | 12/1973 | Patin | 280/62 |
| 4,057,131 | 11/1977 | Flotow | 192/70.13 |
| 4,238,014 | 12/1980 | Petrak | 192/54 |
| 4,287,972 | 9/1981 | Petrak | 192/54 |
| 4,298,112 | 11/1981 | Carstensen | 192/70.13 |
| 4,378,808 | 4/1983 | Petrak | 192/54 |
| 4,441,597 | 4/1984 | Teraoka | 192/54 |
| 4,470,491 | 9/1984 | Teraoka | 192/54 |

Primary Examiner—Raymond A. Nelli
Attorney, Agent, or Firm—Lyon & Lyon

[57] ABSTRACT

A friction clutch in a rear axle assembly to provide differential operation. The friction clutch has variable capacity responsive to the torque loading on the axle. A helical spline coupling is positioned between the clutch and one of the axle shafts to cause compression of the clutch under high torque running. The spline coupling is located between the driving axle shaft and the clutch housing. A clutch spring extends between the clutch housing and the clutch plates and disks such that advancement of the clutch housing further compresses the plates and disks for increased torque capability.

18 Claims, 8 Drawing Figures

FRICTION CLUTCH DIFFERENTIAL AXLE

BACKGROUND OF THE INVENTION

The field of the present invention is vehicle axles of the type employing a friction clutch for differential drive.

Small vehicles, carts and the like driven by power directed to an axle for distribution to parallel wheels at the ends of the axle can exhibit handling difficulty and excessive tire wear if the axle is solid, without differential capability. Differential gearing and ratchet type differentials have been available to accommodate the need for unequal wheel velocity for negotiating turns. However, on vehicles intended to be used or expected to encounter off-road or highly variable friction conditions, such devices tend to direct power unequally to the unloaded wheel. Consequently, more complicated differential systems, limited slip differentials, have been employed.

In smaller vehicles, the use of complicated differential and limited slip differential devices is generally impractical because of the complexity, size and/or cost of such systems. As a result, simpler differential devices employing a friction clutch to give resisted slip differential capability have been employed.

The use of a friction clutch for differential capability requires the selection of a specific response to input torque to the axle. Under road conditions, a relatively light clutch action may be advantageous to allow accommodation of lower torque differential action in making a turn. Under high torque conditions, for example, in off-road high performance usage, greater torque transmitting capabilities through the differential clutch are desirable. Consequently, a compromise design has generally been required of such systems to accommodate a broad range of operating conditions.

SUMMARY OF THE INVENTION

The present invention is directed to a friction clutch mechanism used as a differential system for a driven axle. The friction clutch mechanism exhibits a variable slip capability through an increase in the compression of the clutch disks and plates. This increased compression is responsive to increased torque loading conditions and wheel slippage.

To increase clutch compression, the clutch assembly is compressed through the mechanism of a helical spline coupling between one of the axle shafts and the clutch mechanism. Relative motion between the coupled clutch element and axle shaft causes the clutch element to move inwardly. Greater compression on the spring is experienced as is greater friction capability of the clutch. The clutch plates may be mounted to the clutch housing such that some relative rotation is permitted therebetween. This permits the spline coupling to direct more compression to the clutch assembly.

Through the variable torque capability, a wider range of operating conditions can be accommodated. Under light driving loads, greater slipping ability is permitted for turning. Under heavy torque loads, greater resistance to clutch slippage is provided. Accordingly, it is an object of the present invention to provide an improved friction clutch differential and the axle assembly thereof. Other and further objects and advantages will appear hereinafter.

DETAILED DESCRIPTION OF THE PREFERRED EMBODIMENT

Figure 1:
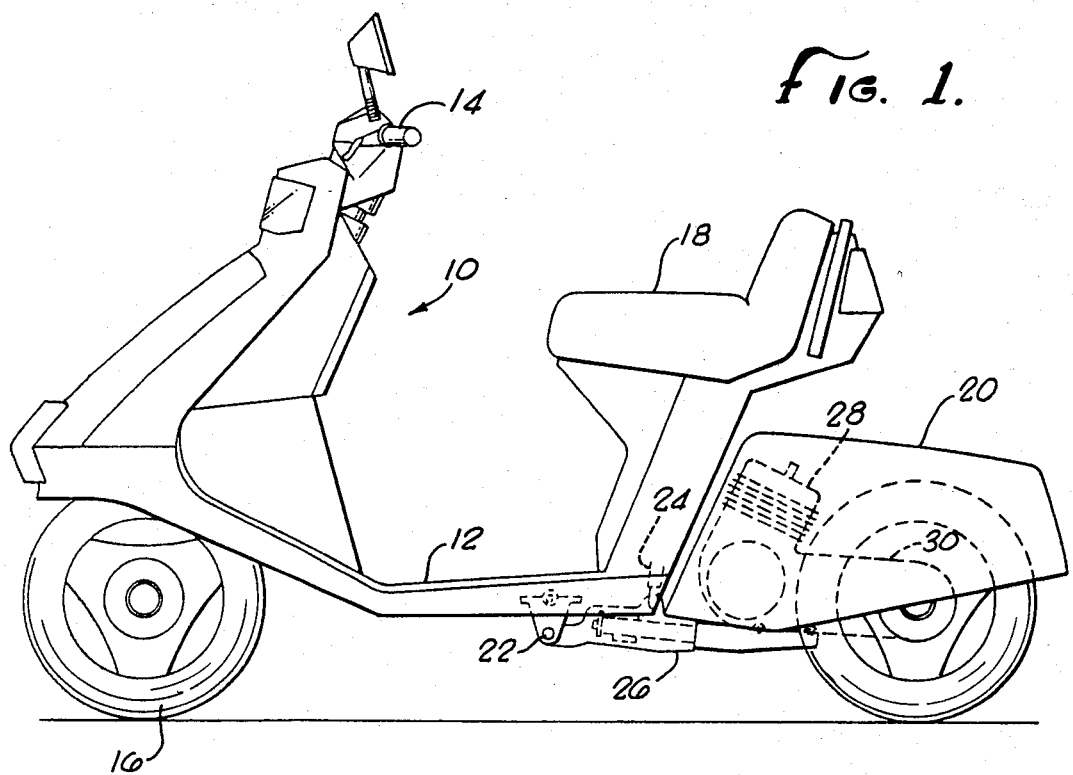
FIG. 1 is a side elevation of a vehicle which may employ the present invention.

FIG. 1 illustrates a three-wheeled vehicle for which the present invention finds substantial utility. The three-wheeled scooter 10 includes a main body 12, a steering assembly 14, a front wheel 16 and a seat 18. A rear body portion 20 is coupled to the main body portion 12 so as to allow relative rotation therebetween about two axes. A pivot axis 22 provides for relative pivotal motion between body portions about a horizontal transverse axis. A cushion assembly 24 resists rotation about the axis 22. Rotation about an axis generally extending longitudinally to the vehicle is accomplished by a pivot mechanism 26.

Figure 2:
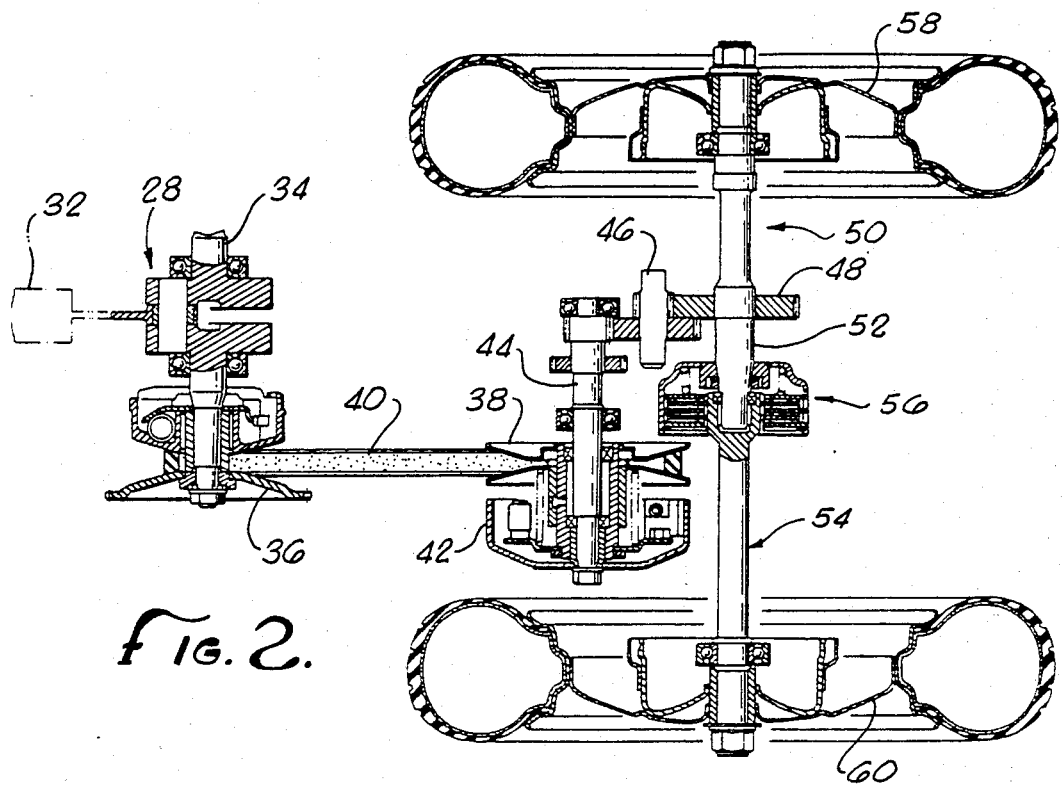
FIG. 2 is a cross-sectional plan view of a rear axle assembly and power train of such a vehicle.
Figure 3:
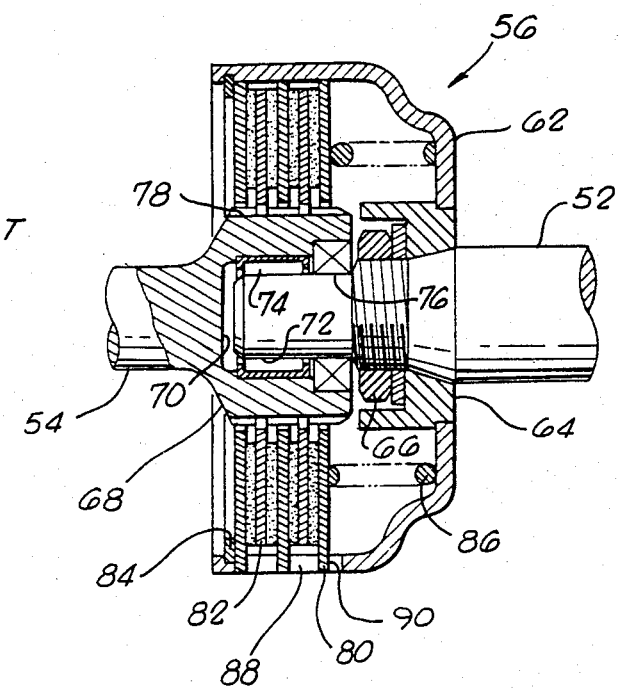
FIG. 3 is a prior art friction clutch illustrated in cross section.
Figure 4:
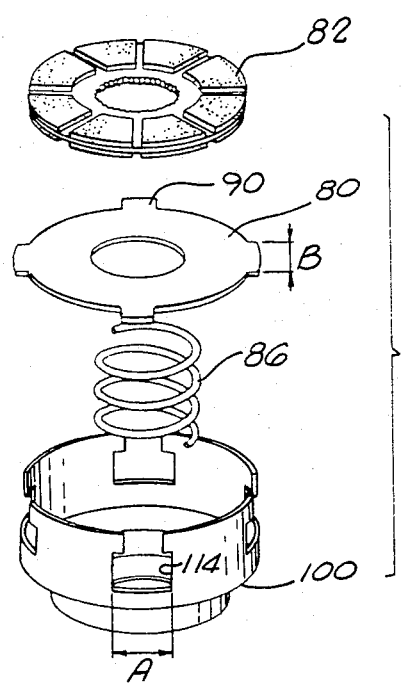
FIG. 4 is an exploded oblique view of the device of the present invention.

The rear body portion 20 is shown to include an engine 28 and drive train 30. As better illustrated in FIG. 2, the engine 28 derives power from a piston 32, directing it through an extension to a crankshaft 34 to a variable ratio drive mechanism. Variable diameter pulleys 36 and 38 accommodate power transmitted by a V-belt 40. A centrifugal clutch 42 is illustrated on the driven pulley 38 and in turn drives a power output shaft 44. The power output shaft 44 is coupled by means of reduction gearing 46 to a final drive gear 48 fixed to an axle assembly generally designated 50. The axle assembly 50 includes a first axle shaft 52 driven by the final drive gear 48 and an axle shaft 54. The axle shaft 54 is coupled with the first axle shaft 52 by means of a friction clutch 56. The axle shafts 52 and 54 extend outwardly to wheels 58 and 60.

Looking in greater detail to a prior art friction clutch, the first axle shaft 52 is rigidly affixed to a clutch housing 62 by means of a hub 64. The hub 64 is held to the shaft by means of a nut 66.

The second axle shaft 54 includes a clutch hub 68. The clutch hub 68 has a concentrically located cavity 70 for receipt of the end portion 72 of the axle shaft 52. Needle-bearing 74 and a seal 76 help retain the components in lubricated coaxial alignment. The hub 68 includes a spline coupling 78 about its periphery.

Located within the clutch housing 62 are three clutch plates 80. Between the clutch plates 80 are clutch disks 82. The clutch disks 82 include clutch friction material on either side thereof to properly interface with the clutch disks 80. A spring clip 84 acts to retain the clutch plates 80 and clutch disks 82 within the clutch housing 62. A clutch spring 86 places the plates and disks in compression against the spring clip 84 to create the appropriate degree of friction.

The clutch plates 80 include radially extending pins which cooperate with axially extending guides or slots 88. Four such pins 90 are arranged about the plates 80 to cooperate with an equal number of slots 88. The engagement of the radial pins 90 with the slots 88 causes the clutch plates 80 to be rotatably driven with the clutch housing 62. The clutch disks 82 are coupled with the splines 78 of the hub 68 such that they rotate with the axle shaft 54. The degree of resistance to clutch slippage between the plates 80 and disks 82 is determined by the preselected compression of the spring 86.

Figure 5:
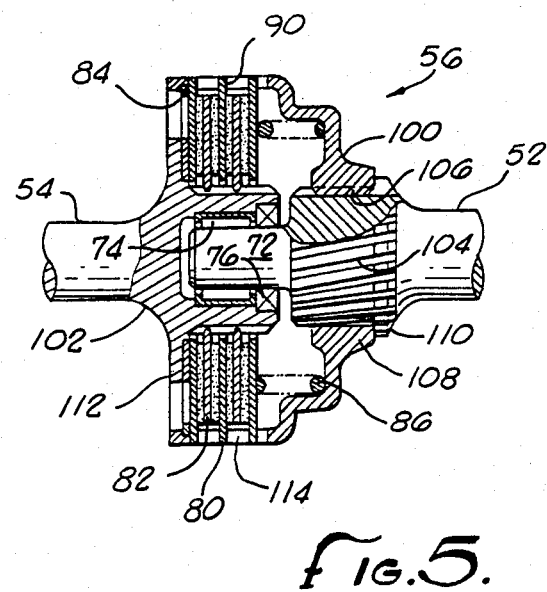
FIG. 5 is a cross-sectional view of a clutch of the present invention.
Figure 6:
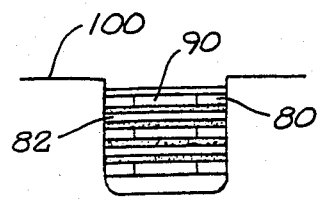
FIG. 6 is a plan view of the top of the clutch of FIG. 5.
Figure 7:
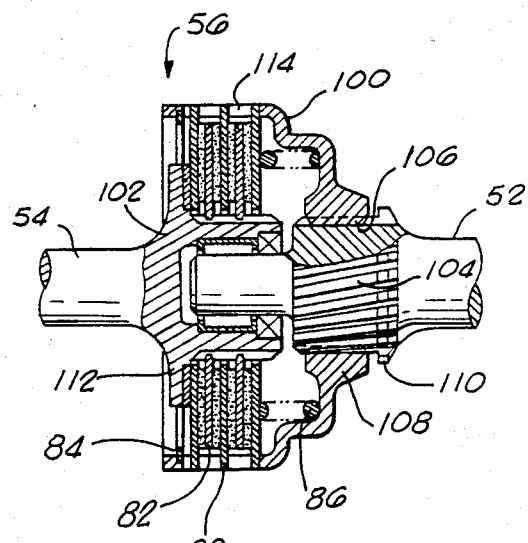
FIG. 7 is the clutch of FIG. 5 illustrated as being under high torque conditions.
Figure 8:
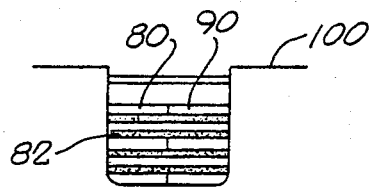
FIG. 8 is a plan view of the top of FIG. 7.

Looking then to the embodiment of the present invention, a plurality of similar components are employed to that of the aforementioned prior art device. Consequently, the same reference numbers will be employed for corresponding elements without inference as to equivalence or functional identity. A clutch housing 100 is employed which is generally cylindrical in shape extending concentrically over a clutch hub 102. Rather than being fixed to rotate with the axle shaft 52, the hub 100 is rotatably driven with the axle shaft 52 by means of a helical spline coupling. Splines 104 on the axle shaft 52 are arranged in a helical pattern as can be seen in FIGS. 5 and 7 to accept a mating spline configuration 106 on the hub 108 of the clutch housing 100. Axial stops 110 are formed at the ends of the splines 104 to restrict axial movement of the clutch housing 100. Through a comparison of FIGS. 5 and 7, it can be seen that the helical spline coupling causes the clutch to compress as the clutch housing 100 is rotated a small amount relative to the axle shaft 52. The helical spline coupling may alternately be provided at the hub 102 such that the clutch may be compressed from the hub side.

An axial stop 112 is located on the axle shaft 54 at the hub 102. The axial stop 112 may be located such that it does not exert any load against the most adjacent clutch plate 80 when the clutch plate 80 is against the clip ring 84. When the clutch housing 100 is caused to advance on the splines 104 as can be seen in FIG. 7, the axial stop 112 is caused to exert pressure against the most adjacent clutch plate 80. In this way, the clip ring 84 may separate from the clutch plate 80. The clutch housing 100 may move toward the axial stop 112 until interference is encountered with the clutch plate 80 upon which the spring 86 rests. Coincident with movement of the clutch housing 100 is the compression of the spring 86. As a result, greater compression is exerted on the clutch plates 80 and clutch disks 82 between the spring 86 and the axial stop 112 with the clutch housing 100 as illustrated in FIG. 7. Alternatively, the axial stop 112 may be held to the hub by a helical spline coupling to achieve compression of the clutch responsive to increased torque conditions.

Four axially extending guides defined as slots 114 are located in the clutch housing 62. The slots 114 having a width A are wider than the radial pins 90 having a width B. Under high torque conditions, the pins 90 are thus able to move with some degree of freedom circumferentially to the side of the guide 114.

Looking to the operation of the present device, moderate torque loads supplied to the axle shaft 52 do not provide sufficient forces to the clutch housing 10 such that it can work against the spring 86 to move to compress the clutch. Consequently, the hub 108 is against the axial stops 110 as can be seen in FIG. 5. Relative slippage between components may then be experienced at a lower torque level because of the instantaneous position of the clutch housing 100. When high torque loads are experienced, the clutch housing 100 will move to further compress the clutch spring 86 as can be seen in FIG. 7. This causes greater clutch friction which will result in a higher clutch torque resistance more useful in higher performance operation. The relative slant of the helical spline coupling is constructed and arranged to advance the clutch housing 100 to greater compression of the clutch plates 80 and clutch disks 82 with increased drive torque. The pins 90 may also advance to full engagement with the side of the axial guide slots under such conditions.

Thus, an improved friction clutch is disclosed for providing variable torque resistance responsive to operating conditions. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An axle having a friction clutch differential comprising
   a first axle shaft extending to receive a wheel;
   a coaxial second axle shaft extending to receive a wheel;
   a clutch between said axle shafts including a clutch housing rotatably driven with said first shaft and having axially extending guides, clutch disks rotatably driven with said second shaft, clutch plates rotatably driven with said axially extending guides, a clutch spring in said clutch housing, and a helical spline coupling between said clutch and one of said axle shafts.

2. The axle of claim 1 wherein said second shaft includes a clutch hub.

3. The axle of claim 2 wherein said clutch housing is generally cylindrical and extends over said clutch hub in coaxial relation.

4. The axle of claim 3 wherein said hub includes a spline coupling with said disks.

5. The axle of claim 1 wherein said axially extending guides include slots and said clutch plates include radial pins engaging said slots.

6. The axle of claim 5 wherein said pins are narrower than said slots in a circumferential direction.

7. The axle of claim 1 wherein said spring extends between said clutch housing and one said clutch plate, said clutch plates and said clutch disks being compressed together by said spring.

8. The axle of claim 1 wherein said helical spline coupling is constructed and arranged to axially compress said clutch responsive to increased drive torque.

9. The axle of claim 1 wherein said helical spline coupling is between said first shaft and said clutch housing.

10. The axle of claim 1 wherein said first shaft receives torque directly from the drive train of the vehicle.

11. An axle having a friction clutch differential comprising
    a first axle shaft extending to receive a wheel;
    a coaxial second axle shaft extending to receive a wheel;
    a clutch housing rotatably driven with said first shaft and having axially extending guides;
    an axial stop on said second shaft;

a clutch hub on said second shaft;

clutch disks rotatably driven with said clutch hub;

clutch plates rotatably driven with said axially extending guides, said disks and plates being axially movable in said clutch;

a clutch spring in said clutch housing biased against said clutch plate and clutch disks; and a helical spline coupling between said clutch housing and said first shaft.

12. The axle of claim 11 wherein said helical spline coupling is constructed and arranged to axially compress said clutch housing toward said clutch stop responsive to increased drive torque.

13. The axle of claim 11 wherein said axially extending guides include slots and said clutch plates include radial pins extending to engage said slots.

14. The axle of claim 13 wherein said pins are narrower than said slots in the circumferential direction.

15. A clutch for differential drive of an axle having a first shaft and a coaxial second shaft, each shaft extending to receive a wheel, comprising a clutch housing rotatably driven with the first shaft and including axially extending guides;

a clutch hub rotatably driven with the second shaft;

clutch plates rotatably driven with said axially extending guides;

clutch disks rotatably driven with said axial stop and clutch hub;

a clutch spring in said clutch housing compressing said clutch disks and said clutch plates; and a helical spline coupling between the first shaft and said clutch housing.

16. The clutch of claim 15 wherein said helical spline coupling is constructed and arranged to axially compress said clutch responsive to increased drive torque.

17. The clutch of claim 15 wherein said axially extending guides include slots and said clutch plates include pins extending radially to engage said slots.

18. The clutch of claim 17 wherein said pins are narrower than said slots in the circumferential direction.

* * * * *